United States Patent
Kleiner et al.

[11] 3,888,930
[45] June 10, 1975

[54] NEW TERTIARY PHOSPHINE OXIDES AND PROCESS FOR THEIR PREPARATION

[75] Inventors: Hans-Jerg Kleiner, Bad Soden, Taunus; Walter Dürsch, Schneidhain, Taunus; Gerhard Stähler, Frankfurt am Main; Werner Racky, Wiesbaden, all of Germany

[73] Assignee: Hoechst Aktiengesellschaft, Frankfurt am Main, Germany

[22] Filed: Nov. 28, 1973

[21] Appl. No.: 419,549

[30] Foreign Application Priority Data
Nov. 30, 1972 Germany............................. 2258662

[52] U.S. Cl............. 260/606.5 P; 106/15; 252/8.1; 260/45.7 P
[51] Int. Cl. ................................................ C07f 9/28
[58] Field of Search............................. 260/606.5 P

[56] References Cited
UNITED STATES PATENTS

| | | | |
|---|---|---|---|
| 3,267,149 | 8/1966 | Garner | 260/606.5 P |
| 3,716,580 | 3/1973 | Maier | 260/606.5 P |
| 3,790,638 | 2/1974 | Kleiner | 260/606.5 P |

FOREIGN PATENTS OR APPLICATIONS

| | | |
|---|---|---|
| 1,230,300 | 8/1966 | Germany |
| 173,765 | 8/1965 | U.S.S.R. |

*Primary Examiner*—Arthur P. Demers
*Attorney, Agent, or Firm*—Curtis, Morris & Safford

[57] ABSTRACT

Tertiary phosphine oxides of the formula

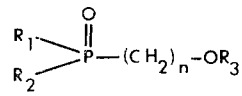

wherein $R_1$ and $R_2$ represent identical or different alkyl groups having from 1 to 6 carbon atoms, and $R_3$ represents a phenyl group substituted by 1 to 5 chlorine and/or bromine atoms or the group

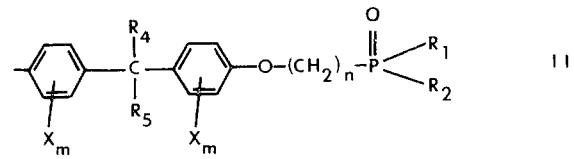

in which X is chlorine and/or bromine, $m$ is 1 to 4, $R_4$ and $R_5$ are hydrogen or alkyl groups having from 1 to 6, carbon atoms, and in formulae I and II $n$ is 1, 2 or 3, and a process for the preparation of the phosphine oxides named and their use as flame retarding agents.

8 Claims, No Drawings

NEW TERTIARY PHOSPHINE OXIDES AND PROCESS FOR THEIR PREPARATION

The present invention concerns new tertiary phosphine oxides and process for their preparation.

It is already known to react trischloromethylphosphine oxide with sodium phenolate, according to which for example $(C_6H_5OCH_2)_2P(O)CH_2Cl$ can be prepared German Patent 1,230,800). It is further described in USSR-Patent No. 173,765 to react methylbischloromethyl-phosphine oxide with sodium phenolate in an inert solvent in an 83.3 % yield to $CH_3P(O)(CH_2OC_6H_5)_2$.

The present invention concerns tertiary phosphine oxides of the general formula

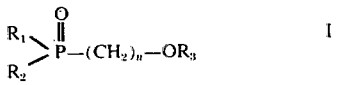   I wherein $R_1$ and $R_2$ represent identical or different, preferably identical, alkyl groups having from 1 to 6, preferably from 1 to 3 carbon atoms, and $R_3$ represents a phenyl group preferably substituted by 1 to 5 chlorine and/or bromine atoms or the group

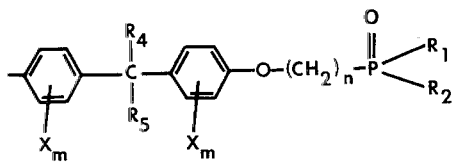   II in which X is chlorine and/or bromine, $m$ is 1 to 4, preferably 1 or 2, $R_1$, $R_2$ are as above and $R_4$ and $R_5$ hydrogen atoms or alkyl groups having from 1 to 6, preferably from 1 to 3 carbon atoms, in formulae I and II $n$ being 1, 2 or 3.

Especially preferred of the compounds of the general formula I are those in which $R_1$ and $R_2$ and, in the case where $R_3$ is a group of the formula II, also $R_4$ and $R_5$ represent the methyl group.

The present invention concerns further a process for the preparation of compounds of the formula I, wherein dialkyl halogeno-alkyl-phosphinic oxides of the formula

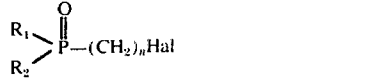   III wherein $R_1$, $R_2$ and n have the above significance and Hal represents a halogen atom, preferably chlorine or bromine, are reacted with alkaline or alkaline earth metal salts of phenol or phenols substituted by from 1 to 5 chlorine and or bromine atoms or of bisphenols of the formula

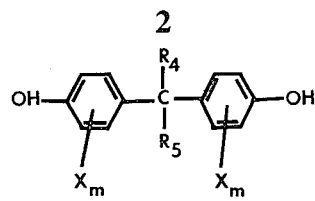   IV the alkaline or alkaline earth metal halide formed is filtered off and the compound of the formula I formed is isolated in known manner.

The dialkylhalogenoalkyl-phosphine oxides used as starting compounds can be prepared according to the process of German Offenlegungsschrift 2 060 217. Suitable phosphine oxides are for example: dimethylchloro-methyl-phosphine oxide, dimethylchloroethyl-phosphine oxide, dimethyl-chloropropyl-phosphine oxide, methylethylchloromethyl-phosphine oxide, diethylchloromethylphosphine oxide, di-n-hexyl-chloromethyl-phosphine oxide.

As starting phenols the following compounds may be considered: phenol, 4-bromophenol, 2,4-dichlorophenol, 2,2,6-trichloro-phenol, 2,4,6-tribromophenol, pentachloro-phenol, pentabromo-phenol, 4,4'-isopropylidene-bis-phenol, 4,4'-isopropylidene-bis-(2,6-dibromophenol), 4,4'-isopropylidene-bis-(2,6-dichloro-phenol).

Suitable salts of these phenols are the alkaline and alkaline earth metal salts, preferably the sodium or potassium salts or also the calcium or magnesium salts. Of course, these salts can also be prepared in situ, for example by adding an alkaline or alkaline earth metal hydroxide, such as NaOH, KOH, $Mg(OH)_2$ or $Ca(OH)_2$, or also the corresponding oxides or carbonates, to the reaction mixture of halogenophosphine oxide and phenol.

The compounds of the invention are preferably prepared in the presence of an inert solvent, such as ethanol, propanol, butanol, glycol, acetonitril, dimethyl formamide, water, chlorobenzene, toluene, dichlorobenzene. Optionally also the reaction product can be used as solvent or as co-solvent. The suitability of solvents is surprising, in which the phenol salts are insoluble, such as chlorobenzene, in which, however, the solubility for phenol salts is increased considerably by the presence of the phosphine oxide.

The reaction is carried out at temperatures of approximately 50° to 250°C preferably from 80°C to 150°C. The reaction can also be carried out under pressure whereby the reaction time can be reduced.

The reaction partners can be added to the reaction in arbitrary sequence. After the conclusion of the reaction, generally the alkali metal halide is separated by filtration. The filtrate is subsequently worked up in known manner. If the reaction product is difficultly soluble in the solvent used in the reaction the separated alkali metal halide is preferably filtered off at an elevated temperature and then the reaction product is isolated from the cooled filtrate by renewed filtration.

The reaction products can be purified in the usual way by distillation or crystallization.

The compounds of the invention are used as flame retarding agents in the preparation of flame resistant linear polyesters (cf. Patent application Ser. No. 419,528 filed concurrently herewith). They have the advantage over the halogen containing organophosphorus compounds, known up to now and used for the finishing of polyesters of a higher thermal stability and very good workability. They can be admixed with the polyesters, during or after the polycondensation, and give them an excellent flame protection when used in quantities of approximately 3 to 20 percent by weight, calculated on the polyesters.

The following examples illustrate the invention.

EXAMPLE 1

126.5 g (1 mol) of dimethylchloromethyl-phosphine oxide, 94 g (1 mol) of phenol and 40 g (1 mol) of sodium hydroxide were kept boiling while stirring in 500 ml of isopropanol for 3 days, then suction filtered. The filtrate was freed by distillation from propanol and water in the water jet vacuum. The residue was distilled. 160 g of dimethylphenoxymethylphosphine oxide were obtained. Boiling point 0.5 Hg 145°C, melting point: 60° – 64°C. This corresponded to a yield of 87 % of the theory.

$C_9H_3O_2P$ molecular weight 184 $(CH_3)_2P(O)CH_2OC_6H_5$

Calculated: 16.85 % P; found: 16.7 % P.

EXAMPLE 2

28 g (0.221 mol) of dimethylchloromethylphosphine oxide and 41 g (0.221 mol) of sodium salt of 2,4-dichlorophenol were heated in 100 ml of dimethyl formamide for 2 hours while stirring at 100°C. After cooling to room temperature the mixture was suction filtered from the precipitated sodium chloride. From the filtrate the dimethyl formamide was distilled off in the water jet vacuum. The residue was distilled. 51 g of dimethyl-2,4-dichlorophenoxymethyl-phosphine oxide were obtained, boiling point 0.04 Hg 155°C – 156°C, melting point: 102° – 103°C. This corresponded to a yield of 91 % of the theory.

$C_9H_{11}Cl_2O_2P$
molecular weight 253

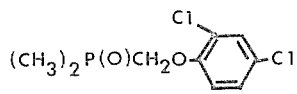

Calculated: 28 % Cl; 12.25 %P; found: 27.7 % Cl; 12.2 %P

EXAMPLE 3

24 g (0.19 mol) of dimethylchloromethyl-phosphine oxide and 37 g (0.19 mol) of sodium salt of 4-bromophenol were refluxed while stirring for 6 hours in 200 ml of acetonitril. Then the precipitated sodium chloride was separated by suction filtration from the mixture and the filtrate was free from acetonitril extensively in the water jet vacuum. The residue crystallized. 48 g of dimethyl-4-bromphenoxymethyl-phosphine oxide were obtained, corresponding to a yield of 96 % of the theory. By recrystallization from benzene the phosphine oxide was purified. Melting point: 119° – 121°C.

$C_9H_{12}PrO_2P$
molecular weight 263

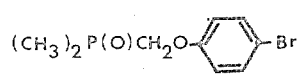

Calculated: 30.4 % Br; 11.8 % P: found: 30.1 % Br; 11.8 % P.

EXAMPLE 4

57.5 g (0.454 mol) of dimethylchloromethyl-phosphine oxide and 100 g (0.454 mol) of the sodium salt of 2,3,6-trichlorophenol were refluxed while stirring together with 500 ml of dimethylformamide. After 5 hours the reaction mixture was cooled. The separated sodium chlodie was filtered off and the filtrate was freed by a distillation in the water jet vacuum extensively from dimethyl formamide. 124 g of dimethyl-2,4,6-trichlorophenoxymethyl-phosphine oxide remained, this corresponded to a yield of 95 % of the theory. The product can be recrystallized from cyclohexane, melting point 121° – 126°C.

$C_9H_{10}Cl_3O_2P$
molecular weight 287.5

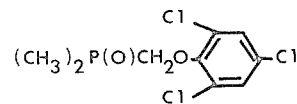

Calculated: 37.1 % Cl; 10.8 % P; found: 37.1 % Cl; 10.8 % P

EXAMPLE 5

52.5 g (0.415 mol) of dimethylchloromethyl-phosphine oxide and 120 g (0.41 mol) of sodium salt of pentachlorophenol were refluxed while stirring vigorously in 500 ml of chlorobenzene for 7 hours. Then the mixture was filtered off from the precipitated sodium chloride and the chlorobenzene was eliminated extensively by a distillation in the water jet vacuum. The residue was recrystallized from ethanol. 110 g of dimethyl-pentachlorophenoxymethyl-phosphine oxide were obtained. Melting point 207°C – 210°C. This corresponded to a yield of 74.5 % of the theory.

$C_9H_8Cl_5O_2P$
molecular weight 356.5

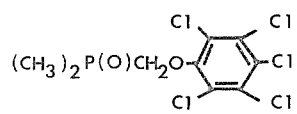

Calculated: 49.8 % Cl; 8.7 % P; found: 50.5 % Cl; 8.4 % P.

EXAMPLE 6

39.5 g (0.312 mol) of dimethylchloromethyl-phosphine oxide and 111 g (0.312 mol) of sodium salt of 2,4,6-tribromophenol were stirred into 400 ml of dimethylformamide at 140°C for 6 hours. Subsequently the mixture was drawn off from the sodium chloride and the filtrate was freed from dimethylformamide extensively by a distillation in the water jet vacuum. The residue was recrystallized from a litle cyclohexene. 92 g of dimethyl-2,4,(tribromophenoxymethyl-phosphinic oxide were obtained. Melting point 125° – 129°C. This corresponded to a yield of 70 % of the theory.

$C_9H_{10}Br_3O_2P$
molecular weight 421

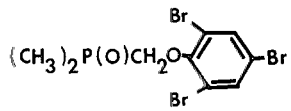

Calculated: 57.0 % Br; 7.35 % P; found: 57.1 % Br; 7.3 % P.

EXAMPLE 7

50.5 g (0.4 mol) of dimethylchloromethylphosphinic oxide and 208 g (0.4 mol) of sodium salt of pentabromophenol were heated to boiling in 500 ml of chlorobenzene for 15 hours while stirring vigorously. Subsequently the mixture was filtered off at 120°C. In the cold the reaction product crystallized from the chlorobenzene and was filtered off. By concentrating the mother liquor further reaction product was gained. The raw product was recrystallized from isopropanol with the addition of water. 175 g of dimethyl- pentabromophenoxymethyl-phosphine oxide were obtained. Melting point approximately 245°C. This corresponded to a yield of 76 % of the theory.

$C_9H_8Br_5O_2P$
molecular weight 575

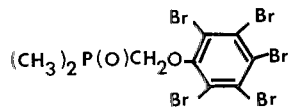

Calculated: 69.2 % Br; 5.35 % P; found: 70.1 % Br; 5.3 % P.

EXAMPLE 8

41 g (0.265 mol) of dimethylchloropropyl-phosphine oxide and 49 g (0.265 mol) of sodium salt of 2,4-dichlorophenol were heated while stirring in 150 ml of dimethylformamide for 3 hours to 100°C. Subsequently the mixture was filtered off from the precipitated sodium chloride. After distillation of the dimethyl formamide in the water jet vacuum 65 g of dimethyl-2,4-dichlorophenoxypropylphosphinic oxide remained as almost colourless oil. This corresponded to a yield of 87.4 % of the theory.

$C_{11}H_{15}Cl_2O_2P$
molecular weight 281

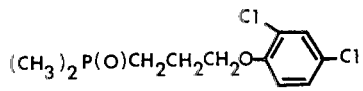

Calculated: 25.3 % Cl; 11.05 % P; found: 24.5 % Cl; 10.9 % P.

EXAMPLE 9

93 g (0.735 mol) of dimethylchloromethyl-phosphine oxide and 100 g (0.368 mol) of disodium salt of 4,4'-isopropylidenebisphenol were refluxed while stirring with 400 ml of chlorobenzene for 5 hours. Subsequently, the mixture was filtered off from the precipitated sodium chloride and the filtrate was freed extensively from chlorobenzene by a distillation in the water jet vacuum. The residue was recrystallized from acetone. 120 g of the derived phosphine oxide were obtained. Melting point 142°C – 148°C. This corresponded to a yield of 80 % of the theory.

$C_{21}H_{30}O_4P_2$
molecular weight 408
Calc.: 15.2 % P;

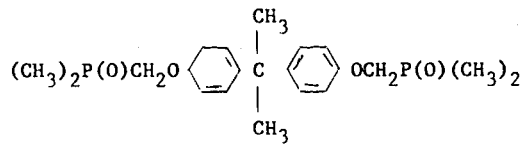

found: 14.9 % P.

EXAMPLE 10

63.9 g (0.505 mol) of dimethylchloromethyl-phosphine oxide, 136 g (0.25 mol) of 4,4'-isopropylidene-bis-(2,6-dibromophenol), 61.2 g (0.505 mol) of a 33 % solution of caustic soda were dissolved while stirring at 60°C in 100 ml of water. To this 150 ml of xylene were added and 150 ml of water were distilled off a azeotropically. After adding 550 g of chlorobenzene the mixture was refluxed for 10 hours and subsequently filtered off while still hot from the precipitated sodium chloride. From the filtrate crystals were separated. these were filtered off and washed well with ethyl acetate. 145 g of the desired phosphine oxide were obtained after drying. This corresponded to a yield of 80 % of the theory. The product could be recrystallized from benzene. Melting point 208° – 209°C.

$C_{21}H_{26}Br_4O_4P_2$
molecular weight 724

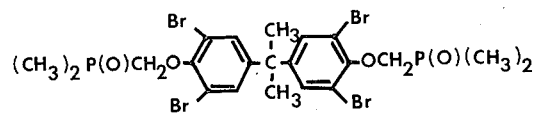

Calc.: 44.1 % Br; 8.6 % P;
found: 43.2 % Br; 8.3 % P.

What is claimed is:

1. A tertiary phosphine oxide of the general formula

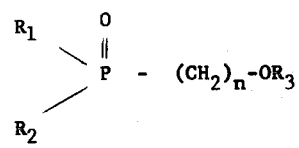

wherein $R_1$ and $R_2$ represent alkyl groups of 1 to 6 carbon atoms and may be the same or different and $R_3$ represents a phenyl group which may be substituted by 1 to 5 chlorine and/or bromine atoms or the group having the general formula

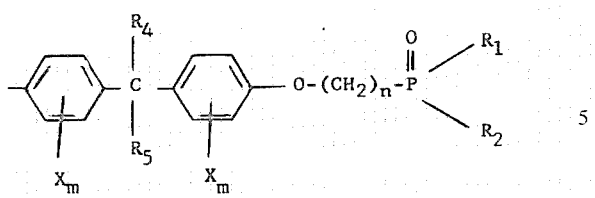

in which X is selected from chlorine and bromine, m is 1 to 4, $R_1$ and $R_2$ are as defined above, $R_4$ and $R_5$ are hydrogen atoms or alkyl groups of 1 to 6 carbon atoms, and n is 1 to 3.

2. A tertiary phosphine oxide of the general formula

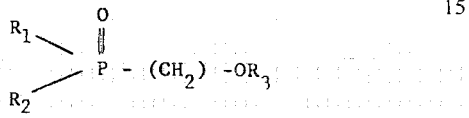

wherein $R_1$ and $R_2$ represent alkyl groups of 1 to 3 carbon atoms and may be the same or different and $R_3$ represents a phenyl group substituted by 1 to 5 chlorine and/or bromine atoms or is the group of the general formula:

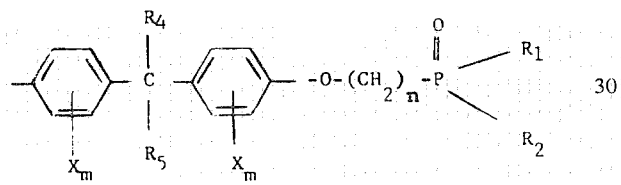

in which X is selected from chlorine and bromine, m is 1 to 4, $R_1$ and $R_2$ are as defined above, $R_4$ and $R_5$ are hydrogen or alkyl groups of 1 to 3 carbon atoms, and n is 1 to 3.

3. A tertiary phosphine oxide according to claim 1 wherein $R_1$ and $R_2$ are methyl, n is 1 and $R_3$ is halophenyl.

4. A tertiary phosphine oxide according to claim 3 wherein $R_3$ is chlorophenyl.

5. A tertiary phosphine oxide according to claim 3 wherein $R_3$ is bromophenyl.

6. A tertiary phosphine oxide according to claim 1 of the formula:

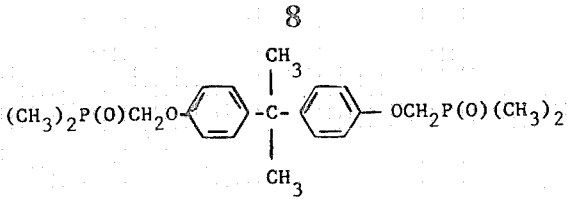

7. A tertiary phosphine oxide according to claim 1 of the formula:

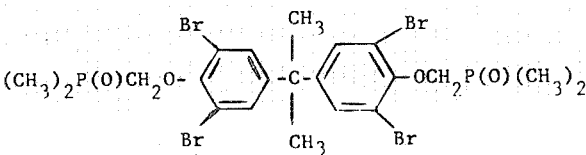

8. A process for the preparation of a tertiary phosphine oxide which comprises reacting a dialkylhaloalkyl phosphine oxide of the formula:

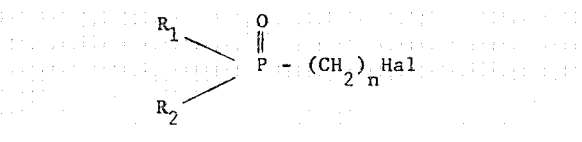

wherein $R_1$ and $R_2$ represent alkyl groups of 1 to 6 carbon atoms and may be the same or different, n is 1 to 3, and Hal represents a halogen atom, with an alkaline or alkaline earth metal salt of phenol or of a phenol substituted by 1 to 5 halogen atoms selected from chlorine and bromine atoms or an alkaline or alkaline earth metal salt of a bis-phenol of the formula:

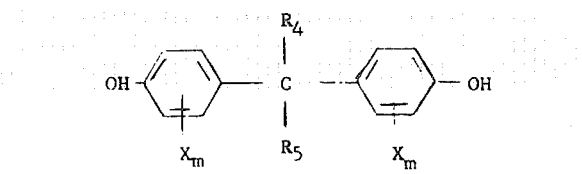

to form a dialkyl-phenoxyalkyl phosphine oxide and an alkaline or alkaline earth metal halide, separating the metal halide by filtration and recovering the dialkylphenoxyalkyl phosphine oxide.

* * * * *